POLYPHASE STATIC INVERTER

Filed Feb. 24, 1959 4 Sheets-Sheet 1

Inventors:
John E. Coolidge and
Fredrick C. Himebrook
By: Ray E. Snyder Atty.

Sept. 4, 1962 J. E. COOLIDGE ET AL 3,052,833

POLYPHASE STATIC INVERTER

Filed Feb. 24, 1959 4 Sheets-Sheet 2

Inventors:
John E. Coolidge and
Fredrick C. Himebrook
By: Ray E. Snyder Atty.

Fig. 6

| | 26 | | 27 | | 28 | | 29 | | 30 | | 31 | |
|---|---|---|---|---|---|---|---|---|---|---|---|---|
| | A | B | A | B | A | B | A | B | A | B | A | B |
| START | OFF | ON | ON | OFF | OFF | ON | ON | OFF | OFF | ON | OFF | ON |
| 1 | ON | OFF | ON | OFF | " | " | " | " | " | " | " | " |
| 2 | " | " | OFF | ON | OFF | ON | " | " | " | " | " | " |
| 3 | " | " | " | " | ON | OFF | ON | OFF | " | " | " | " |
| 4 | " | " | " | " | " | " | OFF | ON | OFF | ON | " | " |
| 5 | ON | OFF | " | " | " | " | " | " | ON | OFF | " | " |
| 6 | OFF | ON | " | " | " | " | " | " | " | " | OFF | ON |
| 7 | " | " | " | " | ON | OFF | " | " | " | " | ON | OFF |
| 8 | " | " | OFF | ON | OFF | ON | " | " | " | " | " | " |
| 9 | " | " | ON | OFF | " | " | " | " | ON | OFF | " | " |
| 10 | " | " | " | " | " | " | OFF | ON | OFF | ON | " | " |
| 11 | " | " | " | " | " | " | ON | OFF | " | " | ON | OFF |
| 12 | OFF | ON | ON | OFF | OFF | ON | ON | OFF | OFF | ON | OFF | ON |

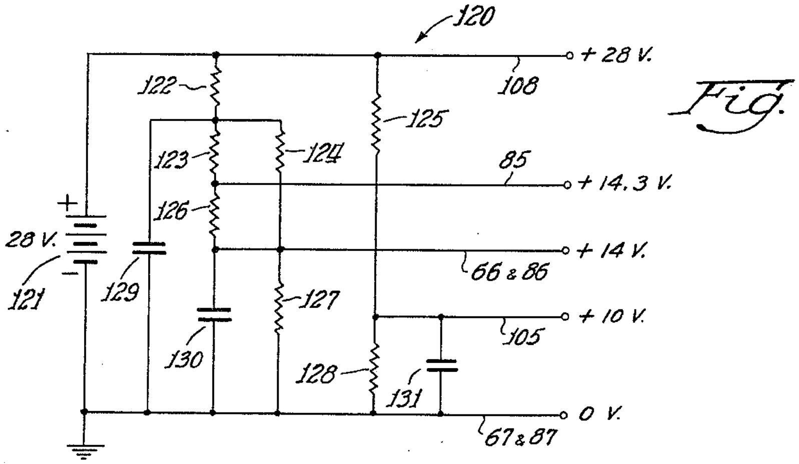

Fig. 8

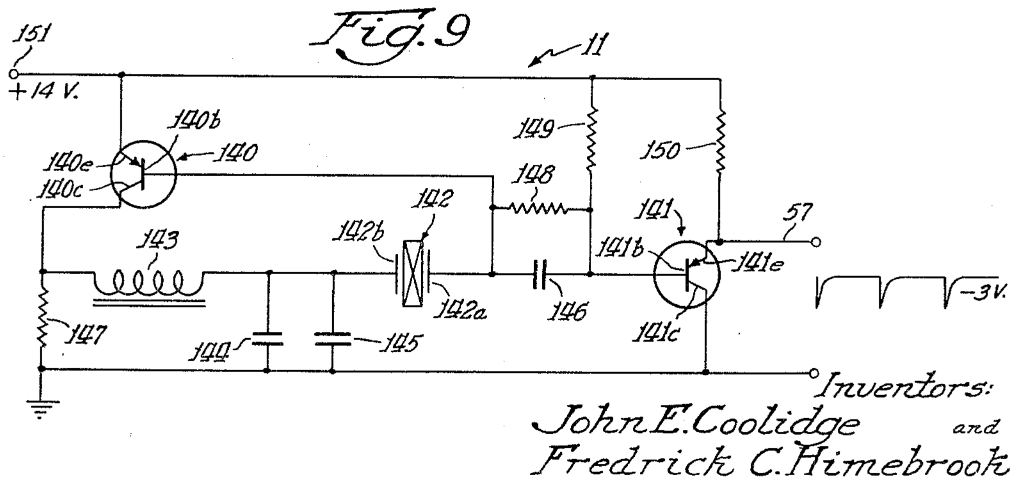

Fig. 9

Inventors:
John E. Coolidge and
Fredrick C. Himebrook
By: Ray E. Snyder Atty.

Sept. 4, 1962 J. E. COOLIDGE ET AL 3,052,833

POLYPHASE STATIC INVERTER

Filed Feb. 24, 1959 4 Sheets-Sheet 4

Inventors:
John E. Coolidge and
Fredrick C. Himebrook
By: Ray E. Snyder Atty.

3,052,833

POLYPHASE STATIC INVERTER

John E. Coolidge, Arlington Heights, and Fredrick C. Himebrook, Des Plaines, Ill., assignors to Borg-Warner Corporation, Chicago, Ill., a corporation of Illinois Filed Feb. 24, 1959, Ser. No. 795,208
4 Claims. (Cl. 321—5)

This invention relates to a logic control circuit or memory matrix particularly for controlling a polyphase static inverter.

The most commonly used inverters are of the vibratory or rotary types. These inverter types have limited application and utility because of their low efficiency, excessive weight, altitude and temperature limitations, frequency instability and wave distortion, and high maintenance requirements.

It is an object of the present invention to provide a static inverter of lighter weight, improved efficiency, and fewer environmental limitations than inverters of existing design.

It is another object to provide a logic control circuit in combination with electrical current conduction controlling means for producing a polyphase A.C. voltage from a D.C. source.

It is still another object to provide a logic control circuit in combination with a crystal oscillator effective to develop a varying voltage step function that can be utilized for producing a polyphase A.C. voltage from a D.C. source.

It is still another object to provide logic control means for producing a polyphase A.C. voltage from a D.C. source, which A.C. voltage is unaffected in phase or frequency by fluctuations in load conditions.

It is still another object to provide a polyphase static inverter having frequency and phase stability unmatched by existing inverter designs of the vibratory or rotary types.

The invention consists of the novel constructions, arrangements and devices to be hereinafter described and claimed for carrying out the above stated objects and such other objects as will appear from the following description of a preferred form of the invention, illustrated with reference to the accompanying drawings, wherein:

Figure 3A:
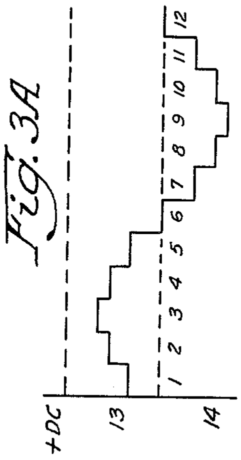
Figure 3B:
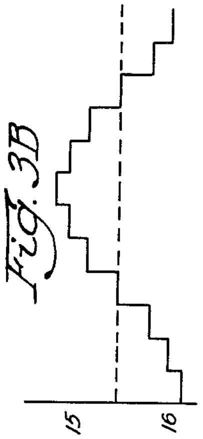
Figure 3C:
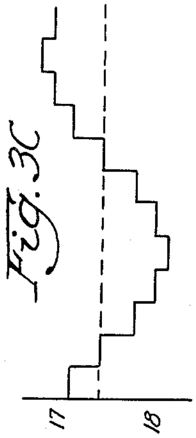
Figure 1:
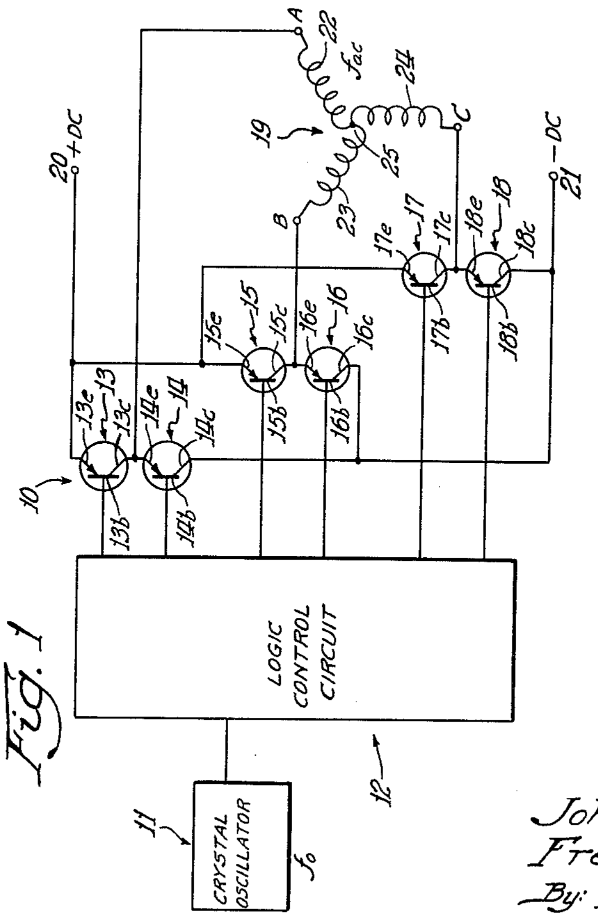
FIG. 1 is a schematic diagram, partially in block form, of the static inverter of the present invention, including power transistors and a logic control circuit.
Figure 4:
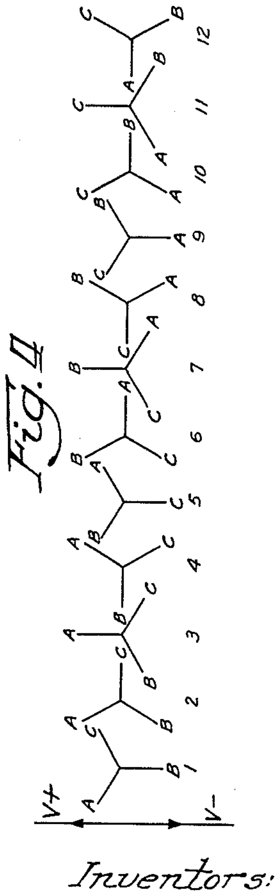
Figure 5:
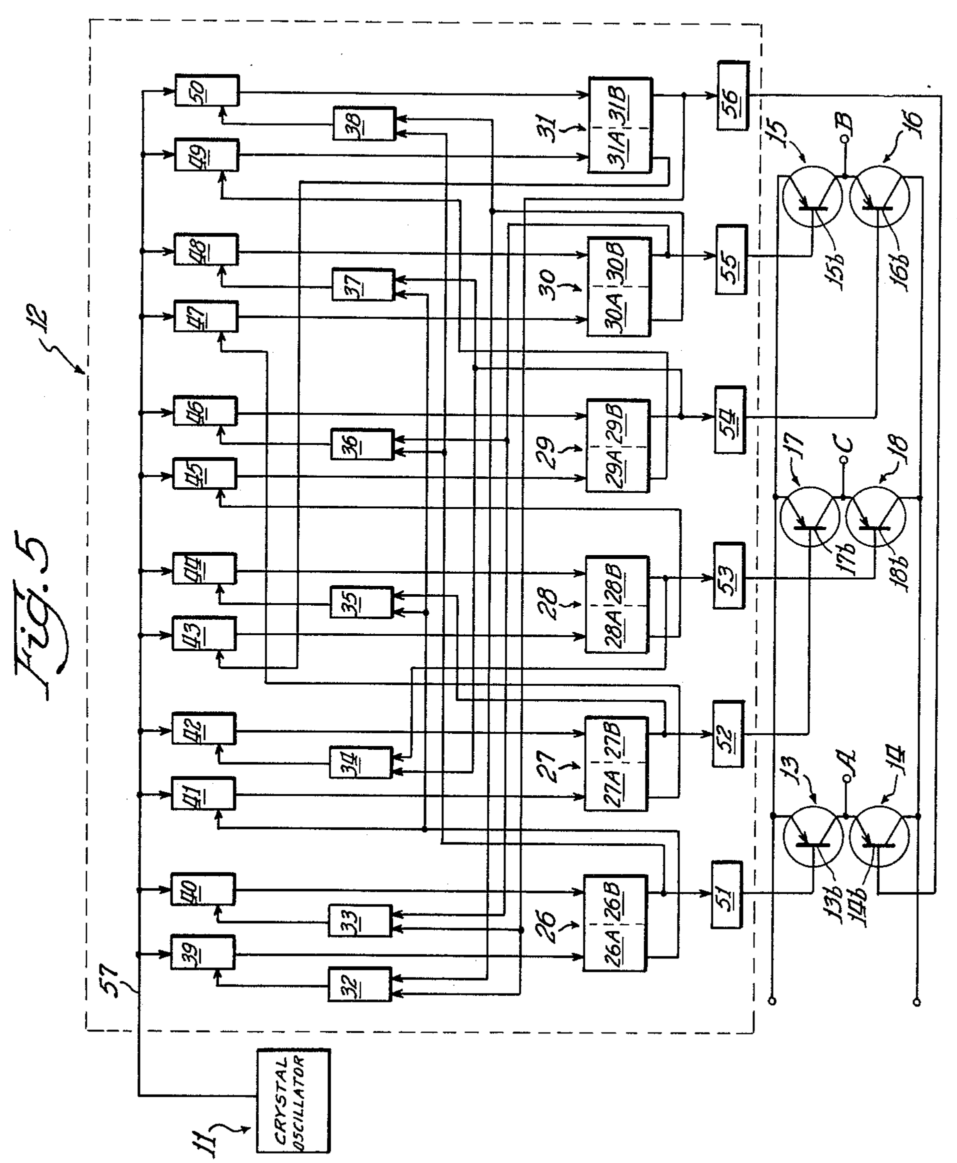
Figure 7:
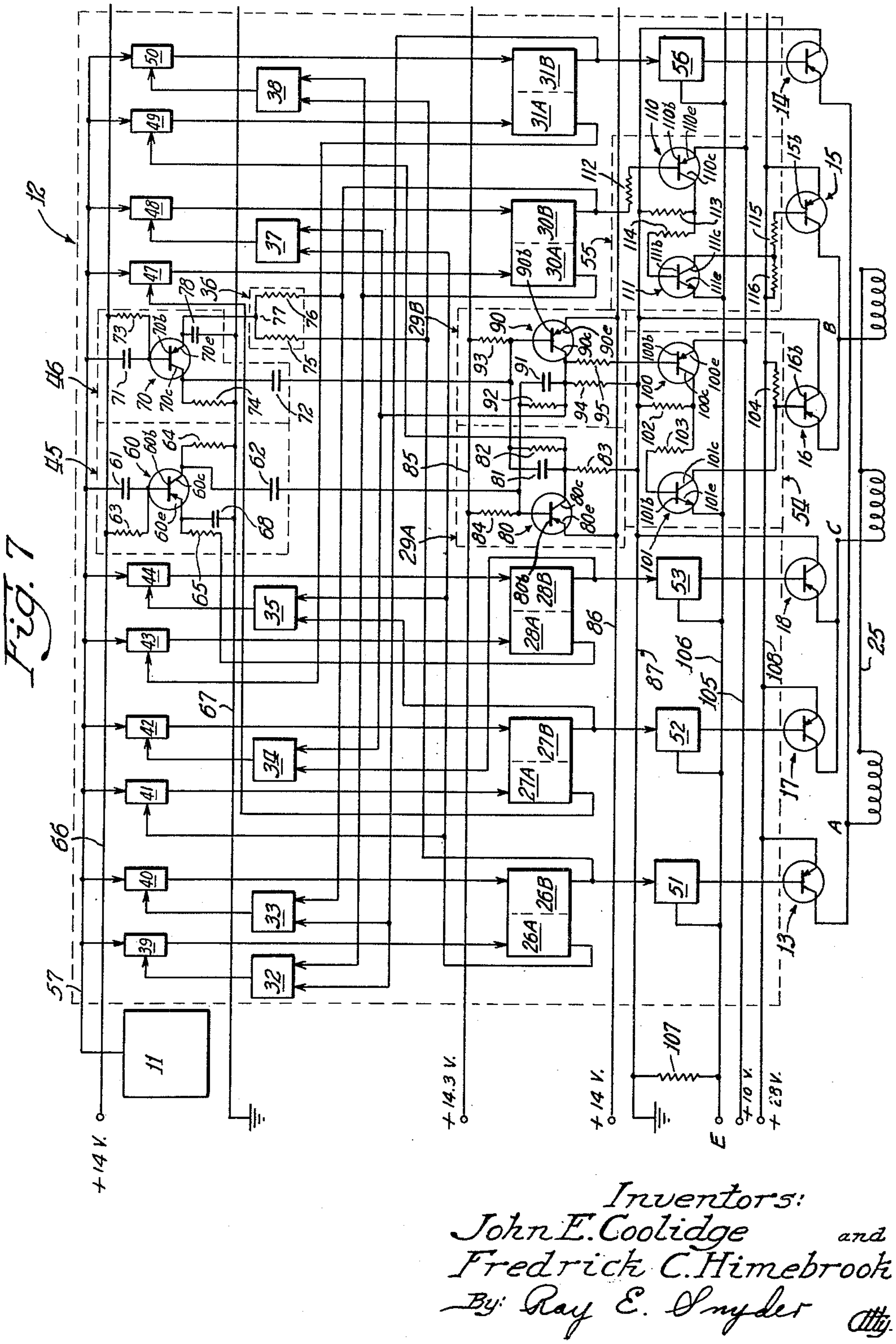

FIGS. 3A, 3B, and 3C are graphs of the voltage waves generated during each cycle by the inverter of FIG. 1;

FIG. 4 is another representation of the voltages developed by the inverter of FIG. 1;

FIG. 5 is a block diagram of the logic control circuit including a plurality of memory circuits;

FIG. 6 is a table setting forth the operative conditions of the memory circuits of FIG. 5;

FIG. 7 is a schematic diagram of portions of the logic control circuit of FIG. 5;

FIG. 8 is a schematic diagram of a power supply for the logic control circuit of FIG. 7; and FIG. 9 is a schematic diagram of a crystal oscillator actuated pulse generator.

Like characters of reference designate like parts in the several views.

Referring now to FIG. 1, there is illustrated a schematic diagram, partially in block form, of the static inverter of the present invention.

The static inverter, designated generally by the numeral 10, is seen to comprise a crystal oscillator 11, a logic control circuit 12, a plurality of power transistors 13, 14, 15, 16, 17, and 18, and a three-phase Y transformer primary 19. The transistor 13 has an emitter 13*e*, a base 13*b*, and a collector 13*c*. Similarly, the transistors 14, 15, 16, 17, and 18 each have an emitter, base, and collector designated in the manner of the transistor 13. The transistors 13–18 are connected in pairs with the collector 13*c* being connected to the emitter 14*e*, the collector 15*c* being connected to the emitter 16*e*, and the collector 17*c* being connected to the emitter 18*e*. In addition, the emitters 13*e*, 15*e*, and 17*e* are all connected to a positive terminal 20 of a D.C. source. The collectors 14*c*, 16*c*, and 18*c* are all connected to a negative terminal 21 of the same D.C. source.

The transformer primary 19 comprises three windings, 22, 23, and 24, all of which are interconnected at a common junction 25. The free end A of the winding 22 is connected to the junction of the collector 13*c* and emitter 14*e*; the free end B of the coil 23 is connected to the junction of the collector 15*c* and the emitter 16*e*; and the free end C of the coil 24 is connected to the junction of the collector 17*c* and to the emitter 18*e*.

The bases of all of the transistors 13–18 are connected to the logic control circuit 12.

The logic control circuit 12 is controlled by the crystal oscillator 11. The crystal oscillator 11 generates a pulsating voltage of a timing frequency $f_0$ which, for the embodiment herein illustrated, is preferably twelve times the desired output frequency $f_{ac}$. For example, if the desired output frequency $f_{ac}$ is to be 400 c.p.s., the frequency output $f_0$ of the crystal oscillator should be $f_0$=4800 c.p.s.

The output frequency $f_0$ is fed into the logic control circuit 12 where it is converted into a voltage step function of twelve steps for controlling the conduction of the power transistors 13–18. The manner in which this voltage step functions is generated for controlling the conduction of the transistors 13–18 will be described hereinafter.

Figure 2:
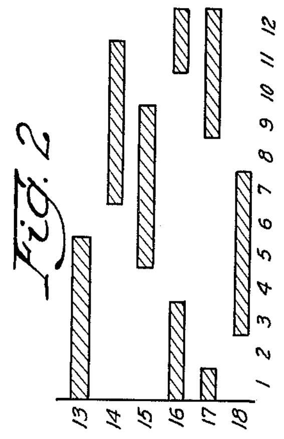
FIG. 2 is a graphical illustration of the power transistor conduction sequence produced by the logic control circuit of FIG. 1.

Referring now to FIG. 2, there is illustrated a diagram of the conduction sequence of the transistors 13–18 during a twelve-step cycle. The shaded areas on this figure indicate the period of conduction of each of the transistors 13–18 during each cycle. From the figure, it is to be noted that the transistor 13 conducts for the first five steps and is off for the remaining seven steps. The transistor 14 is off for the first six steps, conducts for the next five steps, and is off for the twelfth step. The transistor 15 is off for the first four steps, conducts for the fifth through the ninth steps, and is off for the tenth through the twelfth steps. The transistor 16 is on for the first three steps, is off for the fourth through tenth steps, and is on for the eleventh and twelfth steps. The transistor 17 is on for the first step, off for the second through eighth steps, and is on for the ninth through twelfth steps. The transistor 18 is off for the first two steps, on for the third through seventh, and is off for the eighth through twelfth steps.

It should be noted, considering the twelve-step cycle to correspond to 360° of rotation, that the periods of conduction of transistors 13, 15, and 17 are 120° out of phase with each other. Similarly, the periods of conduction of the transistors 14, 16, and 18 are 120° out of phase with each other. Furthermore, the period of conduction of the transistor 13 is 180° out of phase with the period of conduction of the transistor 14.

The voltage appearing across each of the windings 22, 23, and 24 is illustrated in FIGS. 3A, 3B, and 3C, respectively. It is to be noted that the positive half of the voltage wave of FIG. 3A corresponds to the period of conduction of the transistor 13 and the negative half of the voltage wave corresponds to the period of conduction of the transistor 14. The same is true of FIGS. 3B and 3C, with respect to the transistors 15 and 16, and 17 and 18, respectively.

The magnitude and sign of voltage developed across the windings 22, 23, and 24 during each of the twelve steps can be determined by considering the direction of current flow from the D.C. terminals 20 and 21 to and from the conducting transistors through the respective windings 22–24. The junction 25 is taken as a common reference point for determining sign of current flow through the windings 22, 23, and 24. For example, during the first step, the transistors 13 and 16 are conducting and current flows from terminal 20 through the emitter 13*e*, the collector 13*c*, the winding 22, the junction 25, the winding 23, the emitter 16*e*, and the collector 16*c* to the terminal 21. During this first step, the transistor 17 is also conducting and current flows from the terminal 20 through the emitter 17*e*, the collector 17*c*, the winding 24, the junction 25, and the winding 23, the emitter 16*e*, and the collector 16*c* to the terminal 21. The currents flowing into the coils 22 and 24 are equal, and since the impedances of all the coils are equal, the voltages developed across each are equal, and are shown as positive steps on FIGS. 3A and 3C, respectively. The current flowing out through the coil 23 is twice as great as the current into each of the coils 22 and 24 and is considered as negative. The voltage developed across the coil 23 is also negative, as shown on FIG. 3B, and is twice as great as the voltage across the coils 22 and 24.

During the second step, the transistor 13 is still conducting and the transistor 16 is conducting, but transistor 17 is off. For this step, current flows from terminal 20 through emitter 13*e*, collector 13*c*, the winding 22, the junction 25, the coil 23, the emitter 16*e*, and the collector 16*c* to the terminal 21. There is no current flow through the coil 24 since neither of the transistors 17 or 18 are conducting. The voltage developed across the coil 22 therefore is equal to the voltage developed across the coil 23 but is opposite in sign, as shown on FIGS. 3A and 3B. It is to be noted that the voltage wave of FIG. 3C is zero during the second step.

During the third step, the transistors 13 and 16 are still conducting, and the transistor 18 begins conduction. The current flow during this step is from the terminal 20, through the emitter 13*e*, the collector 13*c*, the coil 22, the junction 25, where it divides and flows out through the coils 23 and 24 to the emitters 16*e* and 18*e*, respectively, and through the respective collectors 16*c* and 18*c* to the negative terminal 21. The voltage developed across the coil 22 is twice as great as the voltage across the coils 23 and 24, but is positive, whereas both the latter are negative.

The voltages developed for the remainder of the cycle should be apparent from the description just given.

Another method of representing the conduction sequence for all of the twelve steps in a cycle is shown in FIG. 4. The voltage developed across each of the windings 22, 23, and 24 can be represented by three rotating vectors designated by A, B, and C, and corresponding to the unjoined ends of the windings 22, 23, and 24, respectively.

The magnitude and sign of the voltage developed for each step is represented by the vertical component of each of the three vectors. For example, for the first step, the vectors A and C each have a vertical component of plus one unit, corresponding to the positive steps shown on FIGS. 3A and 3C, respectively. The vector B has a component of minus 2 units corresponding to the negative step shown on FIG. 3B. For the second step, all of the vectors A, B, and C have rotated clockwise 30 degrees. The vector A has a vertical component of slightly more than 1½ units positive, while the vector B has an equal but negative vertical component. The vertical component of the vector C is zero corresponding to the horizontal position of this vector.

For the third step, the vectors A, B, and C have rotated another 30 degrees, and the vector A has a vertical component of two units positive, while the vectors B and C each have a negative component of one unit.

The remaining steps shown in the FIGURE corresponds to successive rotations of 30 degrees so as to complete the twelve step cycle.

Referring to FIG. 5, there is illustrated a block diagram of the logic control circuit 12 and also showing the crystal oscillator 11 and the power transistors 13–18.

The logic control circuit 12, in general, comprises a plurality of memory circuits 26, 27, 28, 29, 30, and 31; a plurality of "hold-off" circuits 32, 33, 34, 35, 36, 37, and 38; and a plurality of "and" circuits 39, 40, 41, 42, 43, 44, 45, 46, 47, 48, 49, and 50.

Each of the memory circuits 26–31 is composed of two halves, 26A, 26B; 27A, 27B; 28A, 28B; 29A, 29B; 30A, 30B; and 31A, 31B. There is an input connection and an output connection to each half of the memory circuits 26–31. The output connection of each of the "B" halves of the memory circuits 26–31 are connected through collector follower circuits 51, 52, 53, 54, 55, and 56, respectively, to the bases of the transistors 13–18 and control their conduction, as will be described.

Each of the "hold-off" circuits 32–38 has two input connections and one output connection. Similarly, each of the "and" circuits 39–50 has two input connections and one output connection. One input of each of the "and" circuits 39–50 is connected to the crystal oscillator 11 through a common timing line 57. The output connection of the "and" circuit 39 is connected to the input of 26A. The output of the "and" circuit 40 is connected to the input of 26B. Similarly, the "and" circuits 41 and 42 are connected to the memory circuit 27; the "and" circuits 43 and 44 to the memory circuit 28; the "and" circuits 45 and 46 to the memory circuit 29; the "and" circuits 47 and 48 to the memory circuit 30; and the "and" circuits 49 and 50 to the memory circuit 31.

The second input of the "and" circuit 39 is connected to the output of the "hold-off" circuit 32; the second input of the "and" circuit 40 is connected to the output of the "hold-off" circuit 33; the second input of the "and" circuit 42 is connected to the output of the "hold-off" circuit 34; the second input of the "and" circuit 44 is connected to the output of the "hold-off" circuit 35; the second input of the "and" circuit 46 is connected to the output of the "hold-off" circuit 36; the second input of the "and" circuit 48 is connected to the output of the "hold-off" circuit 37; and the second input of the "and" circuit 50 is connected to the output of the "hold-off" circuit 38.

The output connection of 26A is connected to the second input of the "and" circuit 41 and to one input of each of the hold-off circuits 35 and 37. The output of 26B is connected to the input of the collector follower 51 and to one input of each of the "hold-off" circuits 36 and 38. The output 27A is connected to the second input of the "and" circuit 47. The output of 27B is connected to the input of the collector follower 52 and to the second input of the "hold-off" circuit 35. The output of 28A is connected to the second input of the "and" circuit 45. The output of 28B is connected to the input of the collector follower 53 and to one input of the "hold-off" circuit 34. The output of 29A is connected to the second input of the "and" circuit 49. The output of 29B is connected to the input of the collector follower 54 and to the second input of each of the "hold-off" circuits 34 and 37. The output of 30A is connected to one input of the "hold-off" circuit 32 and to the second input of the "hold-off" circuit 38. The output of 30B is connected to the input of the collector follower 55, and to one input of each of the "hold-off" circuits 33 and 36. The output of 31A is connected to the second input of the "and" circuit 43. The output of 31B is connected to the input of the collector follower 56, and to the second input of each of the "hold-off" circuits 32 and 33.

The output of the collector follower 51 is connected to 13*b*; the output of 52 is connected to 17*b*; the output of 53 is connected to 18*b*; the output of 54 is connected to 16*b*; the output of 55 is connected to 15*b*; and the output of 56 is connected to 14*b*.

The frequency output $f_o$ of the crystal oscillator 11 that is fed to each of the "and" circuits 39–51 is in the form of a series of differentiated negative pulses. These pulses may have a magnitude of approximately minus 3 volts and a duty cycle of approximately 10 percent. These pulses are applied simultaneously through the timing line 57 to one input of each of the "and" circuits 39–50. A particular "and" circuit passes these pulses on to a respective memory circuit only when a signal is applied simultaneously to the second input of that particular "and" circuit. The second signal applied to a particular "and" circuit for causing it to conduct is supplied from one of the memory circuits 26–31 or from one of the "hold-off" circuits 32–38. A particular "hold-off" circuit is operative to supply a signal to an "and" circuit only when signals are supplied simultaneously to its two input connections.

The timing of a second signal to a particular "and" circuit is determined by the operative conditions of the memory circuits 26–31. In operation, one half of each of the memory circuits 26–31 is either on or off at a particular time, and is operative to supply a signal to a "hold-off" circuit or to an "and" circuit only when on. A pulse supplied from a particular "and" circuit to one half of a memory circuit is operable to switch that half from on to off. If the particular half of the memory circuit is already off, a pulse from the "and" circuit has no effect.

The timing sequence of the second signals to the respective "and" circuits is set forth in FIG. 6.

The initial conditions set forth in the table at "start" show that 26A is off and 26B is on; 27A is on and 27B is off; 28A is off and 28B is on; 29A is on and 29B is off; 30A is off and 30B is on; and 31A is off and 31B is on.

When 31B is on, it supplies a signal to one input of the "hold-off" circuit 33, and with 30B on, it supplies a signal to the second input connection of the "hold-off" circuit 33. A signal is thus supplied from the output connection of 33 to the second input of the "and" circuit 40. The "and" circuit 40 then is in a condition to conduct, and when a pulse is supplied to the first input from the crystal oscillator 11, the "and" circuit 40 does conduct and passes the pulse to the input of 26B. This pulse switches 26B from on to off and it remains in this condition until the above described conditions are repeated.

When 26A is turned on, by virtue of the fact that 26B is turned off, a signal is supplied from the output of 26A to the second input of the "and" circuit 41. When the second pulse from the crystal oscillator 11 arrives at the first input, the "and" circuit 41 conducts and passes the pulse on to the input of 27A. This half of the memory circuit 27 originally was on, and the incoming pulse switches it from on to off.

Switching 27B on, by virtue of 27A being switched off, produces a signal at the output of 27B which is supplied to one input of the "hold-off" circuit 35. A signal from the output of 26A, which was switched on during the first step, is supplied to the second input of the "hold-off" circuit 35. With two input signals supplied to "hold-off" circuit 35, a signal appears at the output which is applied to the second input of the "and" circuit 44. When the next or third pulse arrives from the crystal oscillator 11, the circuit 44 conducts and the pulse is applied to 28B, switching it from on to off.

The switching sequence for the remainder of the cycle is readily apparent from an examination of the conditions set forth in the table of FIG. 6.

The output signals from the memory circuits 26–31 are suplied from the "B" halves through the collector followers 51–56, according to the switching sequence set forth, and these signals are applied to the bases of the transistors 13–18. The transistors 13–18 are caused to conduct in accordance with the same switching sequence and produce the 3-phase alternating voltage appearing across the primary of the transformer 19.

Referring to FIG. 7, there are illustrated schematic diagrams of portions of the logic circuit 12 superimposed upon the block diagram of FIG. 5. The schematic diagrams are included to illustrate preferred types of circuits that may be contained within the blocks of the diagram of FIG. 5. The schematic portion of the figure shows how the various components of the blocks are interconnected, and it is to be understood that similar components may be utilized in each of the respective blocks shown on the remainder of the figure, unless otherwise stated.

The "and" circuit 45 comprises a transistor 60, capacitors 61 and 62, and resistors 63, 64, and 65. The transistor 60 has a base 60*d*, a collector 60*c*, and an emitter 60*e*. The base 60*b* is connected through the capacitor 61 to the timing line 57 and through the resistor 63 to a positive 14 volt D.C. line 66. The collector 60*c* is connected through the capacitor 62 to the input of the memory circuit 29A and through the resistor 64 to a ground line 67. The emitter 60*e* is connected through a time delay capacitor 68 to the ground line 67 and through the resistor 65 to the output of the memory circuit 28A.

The "and" circuit 46 comprises a transistor 70, capacitors 71 and 72, and resistors 73 and 74. The transistor 70 has a base 70*b*, a collector 70*c*, and an emitter 70*e*. The base 70*b* is connected through the capacitor 71 to the timing line 57 and through the resistor 73 to the 14 volt line 66. The collector 70*c* is connected through the capacitor 72 to the input of the memory circuit 29B and through the resistor 74 to the ground line 67. The emitter 70*e* is connected to the output of the hold-off circuit 36 and also through a time delay capacitor 78 to the ground line 67.

The hold-off circuit 36 comprises resistors 75 and 76. One end of each of the resistors 75 and 76 is connected together at a common junction 77 which is connected to the emitter 70*e*. The other end of the resistor 75 is connected to the output of the memory circuit 26B. The other end of the resistor 76 is connected to the output of the memory circuit 30B.

The memory circuit 29A comprises a transistor 80, a capacitor 81, and resistors 82, 83, and 84. The transistor 80 has a base 80*b*, a collector 80*c*, and an emitter 80*e*. The base 80*b* is connected to the output of the "and" circuit 45 and through the resistor 84 to a positive 14.3 volt D.C. line 85. The base 80*b* is also connected to the memory circuit 29B as will be described thereinafter. The emitter 80*e* is connected to a positive 14 volt D.C. line 86. The collector 80*c* is connected through the resistor 83 to a ground line 87 and also to the second input of the "and" circuit 49. The collector 80*c* is also connected through the parallel combination of the capacitor 81 and the resistor 82 to the memory circuit 29B as will be described hereinafter.

The memory circuit 29B comprises a transistor 90, a capacitor 91, and resistors 92, 93, 94, and 95. The transistor 90 has a base 90*b*, a collector 90*c*, and an emitter 90*e*. The base 90*b* is connected to the output of the "and" circuit 46, to the capacitor 81 and resistor 82 of the memory circuit 29A, and through the resistor 93 to the 14.3 volt line 85. The emitter 90*e* is connected to the 14 volt line 86. The collector 90*c* is connected through the parallel combination of capacitor 91 and resistor 92 to the base 80*b* of transistor 80, and also to one input of each of the hold-off circuits 34 and 37. The collector 90*c* is also connected through the resistor 94 to the ground line 87, and through the resistor 95 to the input of the collector follower circuit 54.

The collector follower circuit 54 comprises transistors 100 and 101, and resistors 102, 103, and 104. The transistor 100 has a base 100*b*, a collector 100*c*, and an emitter 100*e*. The base 100*b* is connected to the output of the memory circuit 29B. The emitter 100e is connected to a positive 10 volt D.C. line 105. The collector 100c is connected through the resistor 102 to the ground line 87 and also through the resistor 103 to the transistor 101. The transistor 101 has a base 101b, a collector 101c, and an emitter 101e. The base 101b is connected through the resistor 103 to the collector 100c. The emitter 101e is connected to a common "E" line designated by the numeral 106. The "E" line 106 is connected to all of the collector followers 51–56 and is also connected through a resistor 107 to the ground line 87. The collector 101c is connected to the base 16b of the power transistor 16 and also through the resistor 104 to a positive 28 volt D.C. line 108.

The collector follower 55 comprises transistors 110 and 111 and resistors 112, 113, 114, 115, and 116. The transistor 110 has a base 110b, an emitter 110e, and a collector 110c. The base 110b is connected through the resistor 112 to the output of the memory circuit 30B. The emitter 110e is connected to the 10 volt line 105. The collector 110c is connected through the resistor 113 to the ground line 87 and also through the resistor 114 to the transistor 111. The transistor 111 has a base 111b, an emitter 111e, and a collector 111c. The base 111b is connected through the resistor 114 to the collector 110c. The emitter 111e is connected to the "E" line 106. The collector 111c is connected through the resistor 115 to the base 15b of the power transistor 15 and also through the resistor 116 to the 28 volt D.C. line 108.

Referring to FIG. 8, there is illustrated a voltage divider network 120 for providing the various operating voltages to the logic control circuit 12. The network 120 comprises a 28 volt battery 121, resistors 122, 123, 124, 125, 126, 127, and 128, and capacitors 129, 130, and 131. The positive terminal of the battery 121 is connected directly to the 28 volt D.C. line 108 and the negative terminal of the battery is connected to the ground lines 67 and 87. The resistors 122, 123, 126, and 127 are connected in series with the 14.3 volt line 85 being connected to the junction of the resistors 123 and 126 and the 14 volt line 66 and 86 being connected to the junction of the resistors 126 and 127. The resistors 125 and 128 are also connected in series across the battery 121 with the 10 volt D.C. line 105 being connected to the junction of the resistors 125 and 128.

Referring to FIG. 9, there is illustrated a schematic diagram of a preferred circuit that may be used for the crystal oscillator 11. The circuit comprises transistors 140 and 141, crystal 142, coil 143, capacitors 144, 145, and 146, and resistors 147, 148, 149, and 150. The transistor 140 has a base 140b, an emitter 140e, and a collector 140c. The emitter 140e is connected to a positive 14 volt D.C. source 151 and to one end of each of the resistors 149 and 150. The base 140b is connected to one side 142a of the crystal 142 and also to one end of the parallel combination of capacitor 146 and resistor 148. The collector 140c is connected through the coil 143 to the other side 142b of the crystal 142 and also through the resistor 147 to ground. The capacitors 144 and 145 are connected in parallel between the side 142b and ground. The transistor 141 has a base 141b, an emitter 141e, and a collector 141c. The base 141b is connected to the other side of the parallel combination of capacitor 146 and resistor 148 and also to the other end of the resistor 149. The collector 141c is connected directly to ground. The emitter 141e is connected to the other end of the resistor 150 and to the output or timing line 57.

The crystal oscillator 11 functions to provide an output voltage in the form of a series of spiked negative pulses having a magnitude of approximately minus 3 volts. The repetition rate or frequency of the pulses is determined by the fundamental frequency of the crystal 142. The crystal oscillator 11 operates as follows:

The oscillator circuit 11 is turned on by connecting it to the positive 14 volt D.C. line which causes current to flow through the emitter 140e, the collector 140c and the resistor 147 to ground. Unbalance within the electrical circuit sets the crystal 142 in oscillation at its fundamental frequency. Voltage developed on the side 142a of the crystal 142 is applied to the base 140b of the transistor 140 for controlling the flow of current through the emitter 140e and collector 140c. The transistor 140 amplifies the voltage applied to the base 140b and also causes a 180° phase shift in the voltage appearing at the collector 140c. The changing voltage on the collector 140c is applied through the coil 143 to the other side 142b of the crystal 142. The coil 143 and the capacitors 144 and 145 produce an additional 90° phase shift in voltage, and the crystal 142 itself produces still another 90° phase shift. There is thus produced a positive feedback voltage which is applied to the base 140b. The energy to sustain oscillation in the circuit 11 is supplied from the 14 volt source 151.

The voltage developed across the crystal 142 is of sufficient magnitude to operate the transistor 140 substantially between the limits of current saturation and cut-off. The voltage wave generated by the oscillator 11, therefore, has the form of a flattened or clipped sine wave. This voltage wave is differentiated by the series combination of the capacitor 146 and the resistor 149 so as to produce a series of positive and negative spiked pulses.

Both the base 141b and the emitter 141e of the transistor 141 are at a positive potential because they are connected to the source 151 through the resistors 149 and 150, respectively; therefore, the positive pulses produced by the differentiator circuit have no effect on the conduction of the transistor 141. The negative pulses do affect the conduction of the transistor 141, however, and these pulses are applied through the base 141b and appear at the emitter 141e as a series of negative going pulses having a magnitude of approximately minus three volts for the components selected. The transistor 141 operates as an emitter follower so there is no voltage phase shift produced at the emitter 141e by virtue of the signals applied to the base 141b. The series of pulses are supplied simultaneously through the timing line 57 to one input of each of the "and" circuits 39–50.

Referring to FIG. 7, a pulse supplied from the timing line 57 passes through the capacitor 61 to the base 60b of the transistor 60. This transistor 60 will pass the pulse on to the memory circuit 29a when and if a signal is supplied simultaneously to the emitter 60e, that is, when the emitter voltage is approximately plus 14 volts in magnitude. At one stage of operation, a signal is so applied from the output of the memory circuit 28a through the resistor 65 to the emitter 60e. The transistor 60 is then in condition to conduct and a negative pulse applied to the base 60b is inverted in phase by the transistor and is applied through the capacitor 62 to the base 80b of the transistor 80. The pulse applied through the capacitor 62 is now positive and, assuming the circuit 29a to be in a state of conduction, this pulse will be effective to turn the transistor 80 from "on" to "off." If the transistor 80 is already off, the incoming pulse has no effect.

Switching the transistor 80 from "on" to "off" causes a negative voltage to be developed at the collector 80c which is applied through the capacitor 81 and resistor 82 to the base 90b of the transistor 90 switching this transistor from "off" to "on." The transistor 90 remains in a state of conduction until a signal is applied from the "and" circuit 46 to turn it off. The resistor 82 discharges the capacitor 81 after a negative signal has been applied to the base 90b.

The collector 80c of the transistor 80 is also connected to the input of the "and" circuit 49, conditioning this circuit for conduction when a subsequent pulse is supplied from the timing line 57.

Switching the transistor 90 from "off" to "on" causes a signal to appear at the collector 90c which is applied to the second inputs of each of the "hold-off" circuits 34 and 37. Another signal is simultaneously applied to the first input of the "hold-off" circuit 37 which combines with the signal applied to the second input and a signal is thus transmitted to the second input of the "and" circuit 48, conditioning it for conduction when the next pulse from the crystal oscillator 11 arrives.

The collector 90c of the transistor 90 is connected through the resistor 95 to the base 100b of the transistor 100 and the increased voltage appearing at the collector 90c when the transistor 90 is switched "on" is effective to switch the transistor 100 from "on" to "off," resulting in decreased voltage at the collector 100c. The decreased voltage at the collector 100c is applied through the resistor 103 to the base 101b of the transistor 101, switching this transistor from "off" to "on" and producing an increased voltage at the collector 101c. The increased voltage at the collector 101c is applied to the base 16b of the power transistor 16, switching it from "on" to "off."

When the "and" circuit 46 is conditioned for conduction, the next pulse arriving from the oscillators 11 is applied through the transistors 70, 90, 100, and 101 in the manner previously described and is effective to switch the transistor 16 from "off" to "on."

The sequence for switching the other power transistors 13–15 and 17 and 18 "on" and "off" is accomplished in substantially the same manner as just described for the transistor 16. Switching the transistors 13–18 "on" and "off" in sequence generates the voltage step function previously described.

The components utilized in the various circuits of the static inverter 10 may preferably be of the type or have the values as follows.

"And" circuit 45:

| | | |
|---|---|---|
| Transistor 60 | | 2N369 |
| Capacitor 61 | mmf | 510 |
| Capacitor 62 | mfd | 0.1 |
| Resistor 63 | ohms | 10K |
| Resistor 64 | do | 6.8K |
| Resistor 65 | do | 15K |
| Capacitor 68 | mmf | 1000 |

Hold-off circuit 36:

| | | |
|---|---|---|
| Resistor 75 | ohms | 15K |
| Resistor 76 | do | 15K |

Memory circuit 29:

| | | |
|---|---|---|
| Transistors 80, 90 | | 2N369 |
| Capacitors 81, 91 | mmf | 1000 |
| Resistors 82, 92 | ohms | 51K |
| Resistors 83, 94 | do | 5.6K |
| Resistor 84 | do | 10K |
| Resistor 93 | do | 12K |
| Resistors 95 | do | 2K |

Collector follower circuits 54 and 55:

| | | |
|---|---|---|
| Transistors 100–110 | | 2N185 |
| Transistors 101–111 | | 2N142 |
| Resistors 102–113 | ohms | 510 |
| Resistors 103–114 | do | 100 |
| Resistors 104–116 | do | 200 |
| Resistor 112 | do | 2K |
| Resistor 115 | do | 50 |
| Resistor 107 | do | 2.5 |

Voltage divider network 120:

| | | |
|---|---|---|
| Resistor 122 | ohms | 100 |
| Resistor 123 | do | 1.8 |
| Resistor 124 | do | 10 |
| Resistor 125 | do | 50 |
| Resistor 126 | do | 1.5 |
| Resistor 127 | do | 150 |
| Resistor 128 | do | 50 |
| Capacitors 129, 130 | | 250 mfd., 50 v. |
| Capacitor 131 | | 250 mfd., 25 v. |

Crystal oscillator 11:

| | | |
|---|---|---|
| Transistors 140, 141 | | 2N369 |
| Crystal 142 | kcs | 4.8 |
| Inductor 143 | mh | 1 |
| Capacitors 144, 145 | mmf | 510 |
| Capacitor 146 | do | 330 |
| Resistor 147 | ohms | 2.2K |
| Resistor 148 | do | 120K |
| Resistor 149 | do | 470K |
| Resistor 150 | do | 3.3K |

There has been provided by this invention an improved static inverter effective to convert direct current voltage into polyphase A.C. voltage. While the circuit described has been applied specifically to a three phase circuit, the principles set forth are equally applicable for generating alternating voltages of any number of phases.

The frequency of operation of the inverter circuit 10 is established by the crystal oscillator 11 and is unaffected by changes in load. The frequency stability of the inverter is precise within the accuracy of the crystal oscillator 11.

It is contemplated that the entire circuit may be potted within a sealed container so as to render it immune from shock and normal changes in environmental conditions.

It is to be understood that this invention is not to be limited to the specific constructions and arrangements shown and described except only insofar as the appended claims may be so limited, as it will be apparent to those skilled in the art that changes may be made without departing from the principles of the invention.

We claim:

1. In an electrical circuit for converting direct current voltage into a polyphase alternating current voltage, the combination of a plurality of power output transistors, a source of direct current voltage connected to energize said transistors, a plurality of memory circuits each connected to one of said power transistors for controlling the conduction thereof, gate circuit means for controlling said memory circuits, feedback means from said memory circuits to said gate circuits for conditioning said gate circuits for conduction, and timing means for triggering said conditioned gate circuits into conduction.

2. In an electrical circuit for producing a polyphase alternating current voltage from a source of direct current voltage, the combination of power output means, a plurality of power transistors connected to the source for supplying current to said power output means in accordance with a predetermined sequence, memory circuit means for controlling the conduction of said power transistors, gate circuit means for controlling said memory circuit means, feedback means from said memory circuit means for conditioning some of said gate circuit means for conduction, and pulse generatng means for triggering said conditioned gate circuit means into conduction for thereby controlling the sequence of conduction of said power transistors.

3. In an electrical circuit for converting direct current voltage into polyphase alternating current voltage, the combination of a plurality of power output transistors, a source of direct current voltage connected to said transistors, memory circuit means connected to each of said power transistors for controlling the conduction thereof, a plurality of gate circuit means connected to said memory circuits for controlling the conduction thereof, feedback means connecting some of said memory circuits directly with some of said gate circuit means for conditioning said gate circuit means for conduction, a plurality of hold-off circuit means interconnecting some of said memory circuits with said gate circuits for also conditioning some of said gate circuits for conduction and timing means connected to said gate circuits for triggering said conditioned gate circuits into conduction, whereby said power transistors are caused to conduct in accordance with a predetermined sequence.

4. In an electrical circuit for converting voltage from a direct current source into three phase alternating current voltage, the combination of six power output transistors connected to the source; six memory circuits connected to respective power transistors for controlling the conduction thereof; twelve gate circuits, two each of which are connected to said memory circuits for controlling the conduction thereof; feedback means interconnecting some of said memory circuits with some of said gate circuits; seven hold-off circuits also interconnecting some of said memory circuits with others of said gate circuits; and timing pulse generating means connected to all of said gate circuits whereby said feedback means and said hold-off means condition some of said gate circuits for conduction in accordance with a predetermined sequence and said pulse generating means trigger said conditioned gate circuits into conduction for thereby controlling the conduction of said power transistors for producing a three phase alternating voltage output.

References Cited in the file of this patent

UNITED STATES PATENTS

| | | |
|---|---|---|
| 2,548,737 | Morris | Apr. 10, 1951 |
| 2,824,274 | Holt | Feb. 18, 1958 |
| 2,899,627 | Steinberg | Aug. 11, 1959 |